(12) United States Patent
Courville et al.

(10) Patent No.: US 12,146,526 B2
(45) Date of Patent: Nov. 19, 2024

(54) BALLSPLINE SHAFT WITH NO BALL RETAINER

(71) Applicant: Steering Solutions IP Holding Corporation, Saginaw, MI (US)

(72) Inventors: Jeffrey P. Courville, Frankenmuth, MI (US); Eduardo R. Mondragon-Parra, Freeland, MI (US); Brian J. Kleinfeld, Saginaw, MI (US); James M. Petrowski, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 443 days.

(21) Appl. No.: 17/526,624

(22) Filed: Nov. 15, 2021

(65) Prior Publication Data
US 2023/0151843 A1    May 18, 2023

(51) Int. Cl.
*F16C 3/035*        (2006.01)
*F16D 3/06*         (2006.01)

(52) U.S. Cl.
CPC .............. *F16C 3/035* (2013.01); *F16D 3/065* (2013.01)

(58) Field of Classification Search
CPC ....... F16C 3/035; F16D 3/065; F16D 2300/06
USPC .................................................. 464/15, 167
See application file for complete search history.

(56) References Cited

U.S. PATENT DOCUMENTS

| | | | | |
|---|---|---|---|---|
| 846,079 A | * | 3/1907 | Yost ......................... | F16C 3/035 464/167 |
| 1,672,015 A | * | 6/1928 | Williams ................. | F16D 3/065 192/69 |
| RE25,489 E | * | 11/1963 | Anderson ............... | F16D 3/065 464/168 |
| 3,183,684 A | * | 5/1965 | Zeidler ................... | F16D 3/065 464/162 |
| 3,186,189 A | * | 6/1965 | Cull ......................... | F16D 3/065 464/167 |
| 3,797,276 A | * | 3/1974 | Orain ....................... | F16D 3/065 464/167 |
| 4,699,522 A | * | 10/1987 | Engel ....................... | F16C 3/035 384/47 |
| 6,217,456 B1 | | 4/2001 | Jacob | |

(Continued)

FOREIGN PATENT DOCUMENTS

| | | | | |
|---|---|---|---|---|
| DE | 1170719 B | * | 5/1964 | ............. F16D 3/065 |
| DE | 1267479 B | * | 5/1968 | ............. F16D 3/065 |

(Continued)

*Primary Examiner* — Josh Skroupa
(74) *Attorney, Agent, or Firm* — Dickinson Wright PLLC (57) ABSTRACT

A shaft assembly for transmitting a torque in a driveline system. The shaft assembly comprises an outer shaft member that extends along an axis and includes an interior surface defining a bore and a plurality of outer grooves at least partially delimiting the bore. An inner shaft member extends along the axis and includes an outer surface defining at least one of a plurality of inner pockets or a plurality of inner grooves aligned with the outer grooves. At least one rolling element is located between the outer grooves and the inner pockets or the outer grooves and the inner grooves. At least one of the outer surface of the inner shaft or the inner surface of the outer shaft is configured to axially retain the at least one rolling element and the shaft assembly does not include a ball retaining cage.

19 Claims, 6 Drawing Sheets

(56) References Cited

U.S. PATENT DOCUMENTS

| | | | | |
|---|---|---|---|---|
| 8,348,773 B2* | 1/2013 | Kozlowski | ............ | F16D 3/221 |
| | | | | 464/15 |
| 2009/0203455 A1* | 8/2009 | Tokioka | ................ | F16D 3/065 |
| | | | | 464/167 |
| 2015/0094158 A1 | 4/2015 | Mondragon et al. | | |
| 2016/0131196 A1* | 5/2016 | Miyawaki | ............ | F16C 3/035 |
| | | | | 464/167 |

FOREIGN PATENT DOCUMENTS

| | | | | | | |
|---|---|---|---|---|---|---|
| GB | 959828 | A | * | 6/1964 | ............ | F16D 3/065 |
| JP | 2004168229 | A | * | 6/2004 | ............ | F16C 3/035 |
| JP | 2007024122 | A | * | 2/2007 | ............ | F16C 3/035 |
| JP | 5347881 | B2 | * | 11/2013 | ............ | F16C 3/035 |

* cited by examiner

BALLSPLINE SHAFT WITH NO BALL RETAINER

TECHNICAL FIELD

The invention generally relates to a shaft assembly for transmitting a torque. More specifically, the invention relates to a telescoping shaft assembly for transmitting torque in a driveline system.

BACKGROUND

A vehicle, such as a car, truck, sport utility vehicle, crossover, mini-van, marine craft, aircraft, all-terrain vehicle, recreational vehicle, or other suitable vehicles, typically include a driveline system for transferring power from an engine or other propulsion system to the wheels. The driveline system generally includes a telescoping shaft assembly capable of transmitting a torque. The telescopic shaft assembly typically includes a tubular outer shaft member and an inner shaft member. The inner shaft member is at least partially disposed within the outer shaft member and moveable relative thereto along a longitudinal axis. The telescopic shaft assembly typically uses rolling elements or bearings between the outer and inner shaft members to reduce friction during repeated telescopic compression and expansion.

The rolling elements of the telescopic shaft assembly are typically configured as steel rollers or steel balls. The rolling elements are configured to roll between the outer and inner shaft members during linear, telescopic movement of the telescopic shaft assembly while rotational torque can continued to be transferred between the outer shaft member and the inner shaft member.

A telescopic shaft configured to connect two constant-velocity joints is known. This configuration typically includes a bearing retaining cage located between the outer and inner shaft that retains the rolling elements. The bearing retaining cage is typically located between the outer and inner shaft via holding elements. While telescopic shafts with bearing retaining cages are popular, they are not without shortcomings. For example, additional packaging space is typically required to locate the ball retaining cage between the outer and inner shaft. The presence of the ball retaining cage typically also results in a hydraulic-effect that negatively impacts free relative telescopic movement.

Accordingly, there is a continuing desire to improve upon the operational framework and efficiency of telescopic shafts in driveline systems to offer longevity of operational life, a reduction of the hydraulic-effect, a reduction in parts, and a reduction of packaging requirements.

SUMMARY

This section provides a general summary of the disclosure and is not to be interpreted as a complete and comprehensive listing of all of the objects, aspects, features and advantages associated with the present disclosure.

This disclosure relates generally to a shaft assembly without a ball retaining cage that improves upon the operational framework of telescopic shafts in driveline systems to offer longevity of operational life, a reduction of the hydraulic-effect, a reduction in parts, and a reduction of packaging requirements.

It is one aspect of the present disclosure to provide a shaft assembly for transmitting a torque. The shaft assembly comprises an outer shaft member that extends along an axis and includes an interior surface defining a bore and a plurality of outer grooves at least partially delimiting the bore. An inner shaft member extends along the axis and includes an outer surface defining at least one of a plurality of inner pockets or a plurality of inner grooves aligned with the outer grooves. At least one rolling element is located between the outer grooves and the inner pockets or the outer grooves and the inner grooves. At least one of the outer surface of the inner shaft or the inner surface of the outer shaft is configured to axially retain the at least one rolling element and the shaft assembly does not include a cage.

It is another aspect of the present disclosure to provide a method of assembling a shaft assembly for transmitting a torque. The method comprises providing an outer shaft member defining a bore, an inner shaft member, and a sleeve. The method further comprises aligning a first end of the sleeve with the bore and a second end of the sleeve with the inner shaft member. The sleeve includes a tapered section and a straight section. The method further comprises locating a first portion of the inner shaft member in the tapered section and placing a first circumferential array of rolling elements into one of inner pockets or inner grooves defined by an outer surface of the first portion of inner shaft member. The method further comprises placing the first portion and the first circumferential array of rolling elements past the tapered section and into a straight section of the sleeve.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Example embodiments will now be described more fully with reference to the accompanying drawings. In general, the subject disclosure is directed to a telescoping shaft assembly for transmitting torque in a driveline system. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, a ballspline shaft with no ball retainer "shaft assembly" and a method of assembly is provided. The shaft assembly and method of assembly that improves upon the operational framework of telescopic shafts in driveline systems to offer longevity of operational life, a reduction of the hydraulic-effect, a reduction in parts, and a reduction in packaging requirements.

Figure 1:
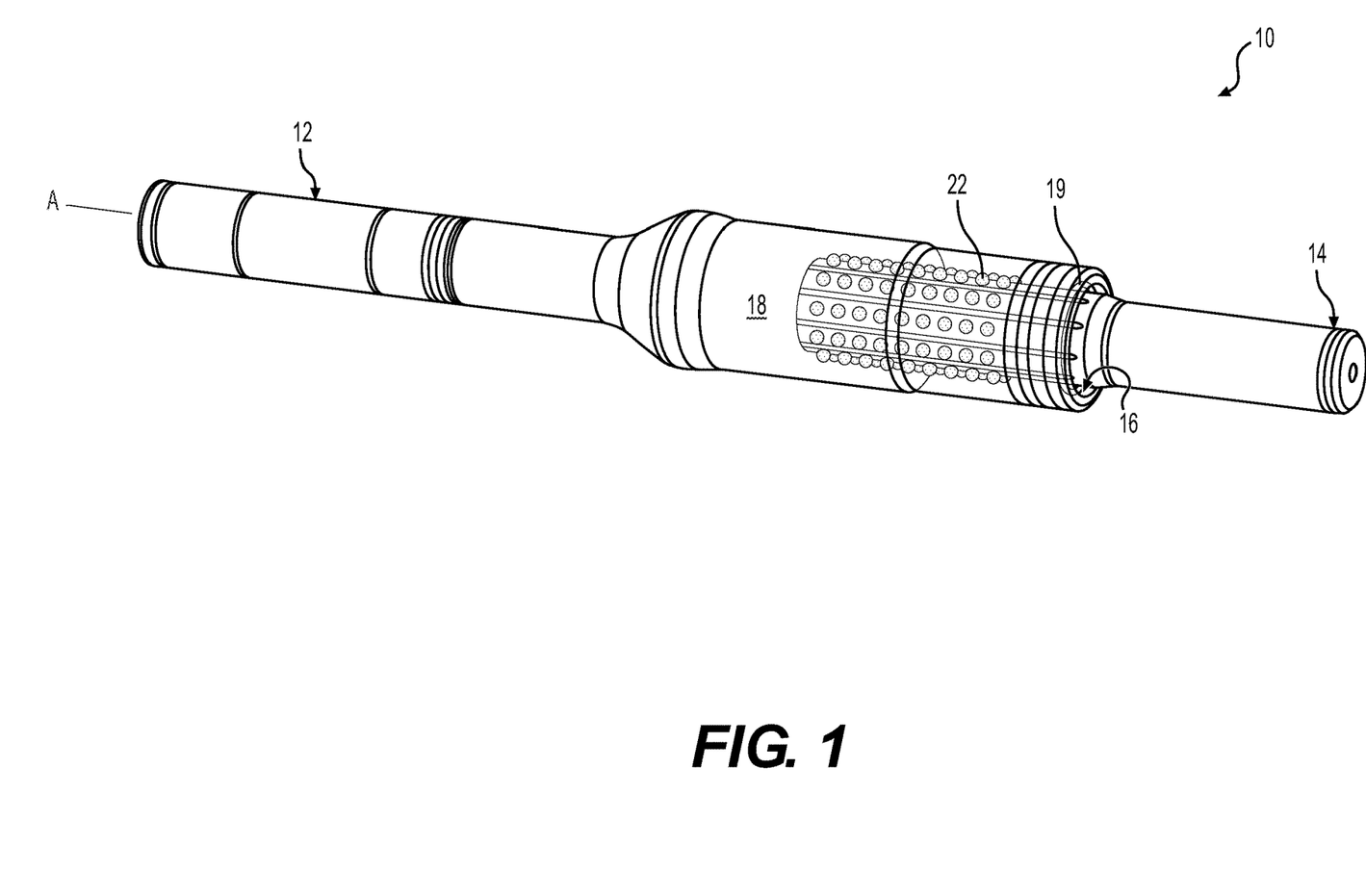
FIG. 1 is a perspective view of a shaft assembly including an inner shaft member and an outer shaft member, wherein the outer shaft member is illustrated as transparent to show features of the inner shaft member according to the principles of the present disclosure.

Referring now to FIG. 1, a shaft assembly is shown generally at 10. The shaft assembly 10 is a rolling-element telescoping shaft assembly 10 capable of connecting to or integrating with a driveline (not shown) and transmitting a torque. Although the shaft assembly 10 may be incorporated into any suitable device, the shaft assembly 10 is particularly suited for use as a telescopic shaft assembly in a driveline system of a vehicle such as an automobile. The shaft assembly 10 includes an outer shaft member 12 and inner shaft member 14 telescopically engaged with the outer shaft member 12. The outer shaft member 12 extends along a longitudinal axis A and defines an inner surface 16, which defines an interior bore 18 centered on the axis A. It should be appreciated that a portion of the outer shaft member 12 that defines the bore 18 may be generally tubular. The inner shaft member 14 is located within the bore 18 and moveable telescopically with respect to the outer shaft member 12. The inner surface 16 may include a ring groove 17 (FIG. 2) for accommodating a snap ring 19 for retaining the inner shaft member 14 within the bore 18.

Figure 2:
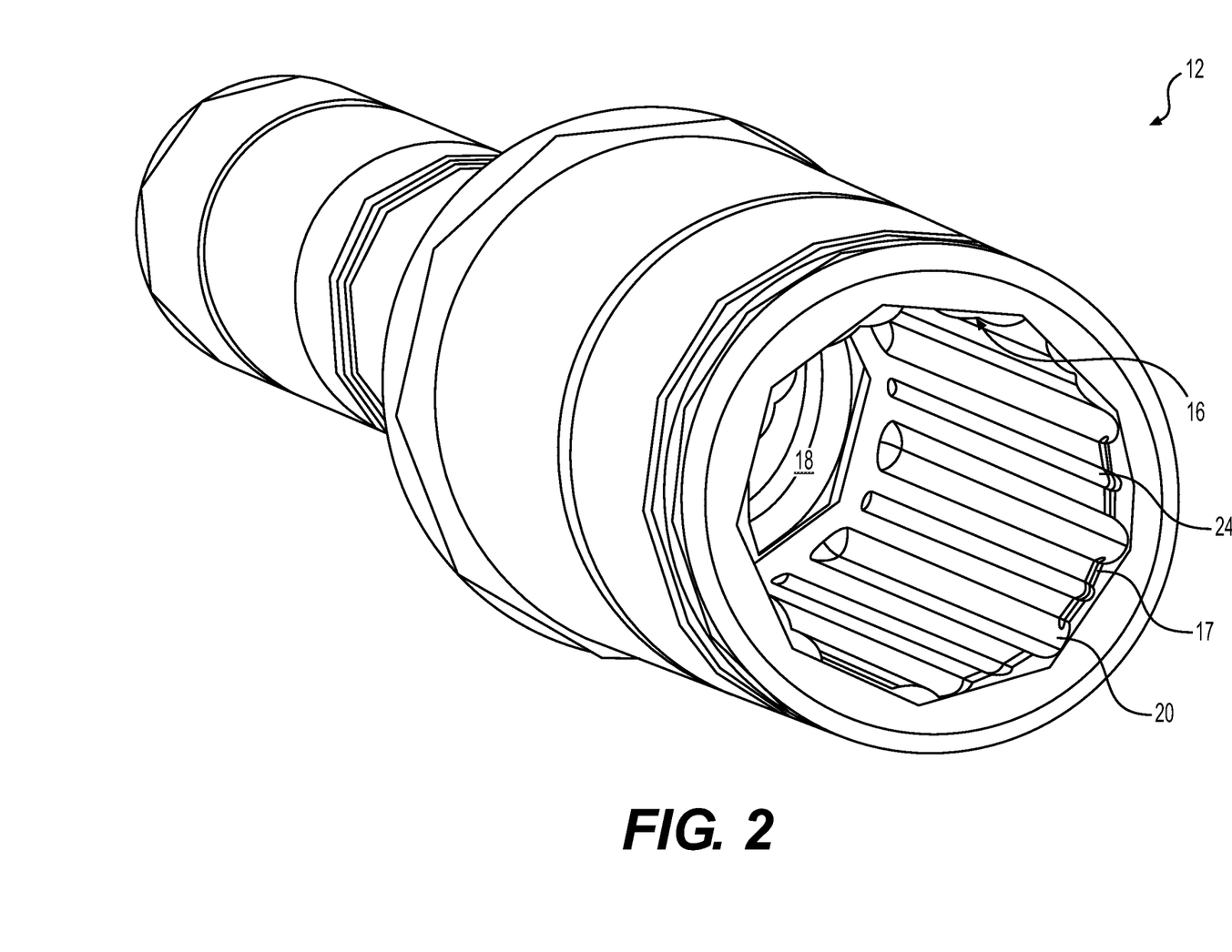
FIG. 2 is a perspective view of the inner shaft member according to the principles of the present disclosure.

As best illustrated in FIG. 2, the inner surface 16 of the outer shaft member 12 defines at least one (e.g., a plurality of) outer grooves 20 arranged in the inner surface 16. Each outer groove 20 extends along and may be disposed generally parallel with the axis A. In some embodiments, each outer groove 20 may be circumferentially equidistant relative to the axis A. In some embodiments, each outer groove 20 may be not circumferentially equidistant relative to the axis A. As will be described in greater detail below, each of the outer grooves 20 may be used to transmit torque to the inner shaft member 14 via one or more bearing elements 22 (FIG. 1) located therein. More particularly, a plurality of bearing elements 22 may be located in each of the outer grooves 20. In some embodiments, each outer groove 20 at least partially houses the same number of bearing elements 22. The inner surface 16 may further define at least one outer fluid groove 24 for reducing pressure build-up via the hydraulic-effect during operation. In some embodiments, the at least one outer fluid groove 24 includes an outer fluid groove 24 next to one of the outer grooves 20. In some embodiments, the at least one outer fluid groove 24 extends along the inner surface 16, parallel to the axis A, an equal or larger length than the outer grooves 20. In some embodiments, the at least one outer fluid groove 24 has a circumferential width and a radial depth that are less than that of the outer grooves 20, for example, half the size or less than half the size. The outer fluid grooves 24 may be positioned symmetrically with respect to the axis A.

Figure 3:
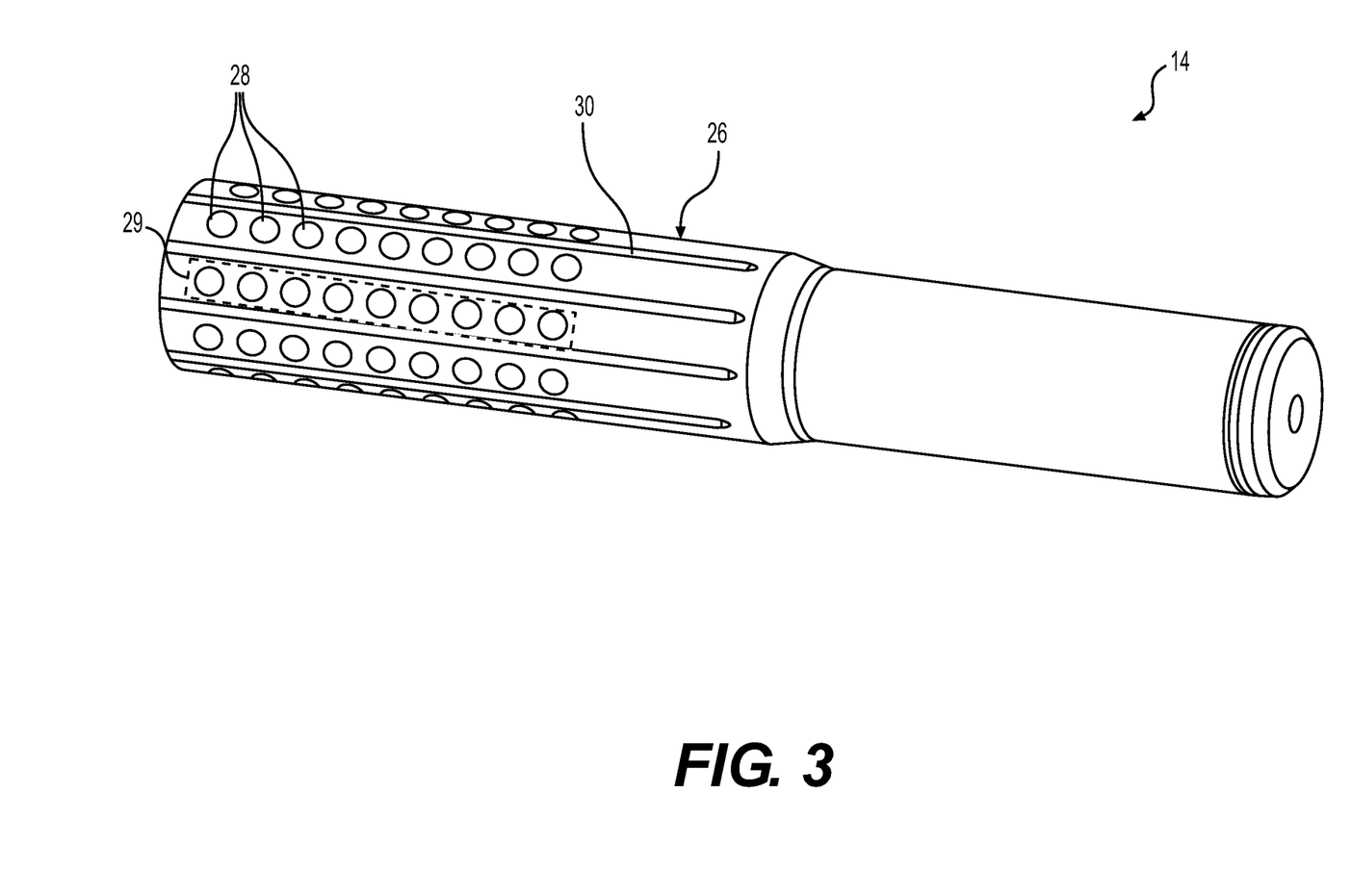
FIG. 3 is a perspective view of the outer shaft member according to the principles of the present disclosure.

As best illustrated in FIG. 1 and FIG. 3, the inner shaft member 14 is at least partially disposed within or enters the bore 18 of the outer shaft member 12. The inner shaft member 14 defines an outer surface 26 that extends and is telescopically moveable generally along the longitudinal axis A when the shaft assembly 10 is assembled. The outer surface 26 of the inner shaft member 14 defines at least one (e.g., a plurality of) inner pockets 28 arranged in the outer surface 26. Each inner pocket 28 may be configured as a partially sphere-shaped depression (e.g., a hemisphere or less). Each inner pocket 28 may be disposed in at least one line of pockets 29 that extends along the axis A and may be disposed generally parallel with the axis A. The at least one line of pockets 29 may include a plurality of lines of pockets 29 and each line of pockets 29 may be circumferentially aligned with one of the outer grooves 20. In some embodiments, each line of pockets 29 may be circumferentially equidistant. In some embodiments, each line of pockets 29 may be not circumferentially equidistant. An imaginary plane defined by an open end of each outer groove 20 may be positioned at an imaginary plane defined by an open end of an inner pocket 28 in a corresponding line of pockets 29 such that corresponding outer grooves 20 and inner pockets 28 generally mirror each other in circumferential positioning. Together, the corresponding outer grooves 20 and inner pockets 28 form respective bearing openings.

In some embodiments, each outer pocket 28 in a line of pockets 29 are spaced axially equidistantly. In some embodiments, the outer surface 26 defines at least one inner fluid groove 30. In some embodiments, the at least one inner fluid groove 30 includes an inner fluid groove 30 between each of lines of pockets 29. In some embodiments, the at least one inner fluid groove 30 extends along the outer surface 26, parallel to the axis A, an equal or larger length than the line of pockets 29. In some embodiments, the at least one inner fluid groove 30 has a circumferential width and a radial depth that are less than that of the inner pockets 28, for example, half the size or less than half the size. The inner fluid grooves 30 may be positioned symmetrically with respect to the axis A and generally circumferentially aligned with the outer fluid grooves 24 with respect to the axis A. The inner pockets 28 may have a circumferential width and a radially depth that is generally equal to that of the inner grooves 20. In some embodiments, the outer grooves 20 extend along the axis A a first distance and the lines of inner pockets 29 extend along the axis A a second distance, wherein the first distance is greater than the second distance.

The shaft assembly 10 includes the plurality of rolling elements 22—e.g., balls or rollers—each of which is rollingly arranged within a corresponding opening between the inner grooves 20 and the outer pockets 28. The rolling elements 22 rollingly engage the outer shaft member 12 and the inner shaft member 14 during relative axial motion between or telescoping movement of the outer shaft member 12 and the inner shaft member 14 with minimum sliding friction. The rolling elements 22 may be formed of stainless steel. In some embodiments, the rolling elements 22 have a diameter and more than half of the diameter is located within the outer grooves 20 and the inner pockets 28. For example, because a cage is not needed, 95% or less, 85% or less, or 75% or less of the diameter of rolling elements 22 may be located within the outer grooves 20 and the inner pockets 28. Moreover, the absence of the ball retaining cage can further permit the shaft assembly 10 to have a smaller outer diameter and a reduction in length as the ball retaining cage typically spaces the rolling elements 22 along the axis A.

A number of lines of pockets 29 can correspond to a number of outer grooves 20, wherein each of the inner pockets 28 in a line of pockets 29 is arranged opposite to a corresponding outer groove 20 to form a pair. The number of pairs may be at least two, at least four, at least six, at least eight, at least ten, or at least twelve. In this case, at least one rolling element 22 is rollingly arranged between each inner pocket 28 and the outer groove 28. A number of inner pockets 28 in each line of pockets 29 may be equal. For example, the number of inner pockets 28 in each line of pockets 29 may be at least two, at least four, at least six, at least eight, at least ten, or at least twelve. In the illustrated embodiment, the number of inner pockets 28 in each line of pockets 29 may be nine.

Figure 4:
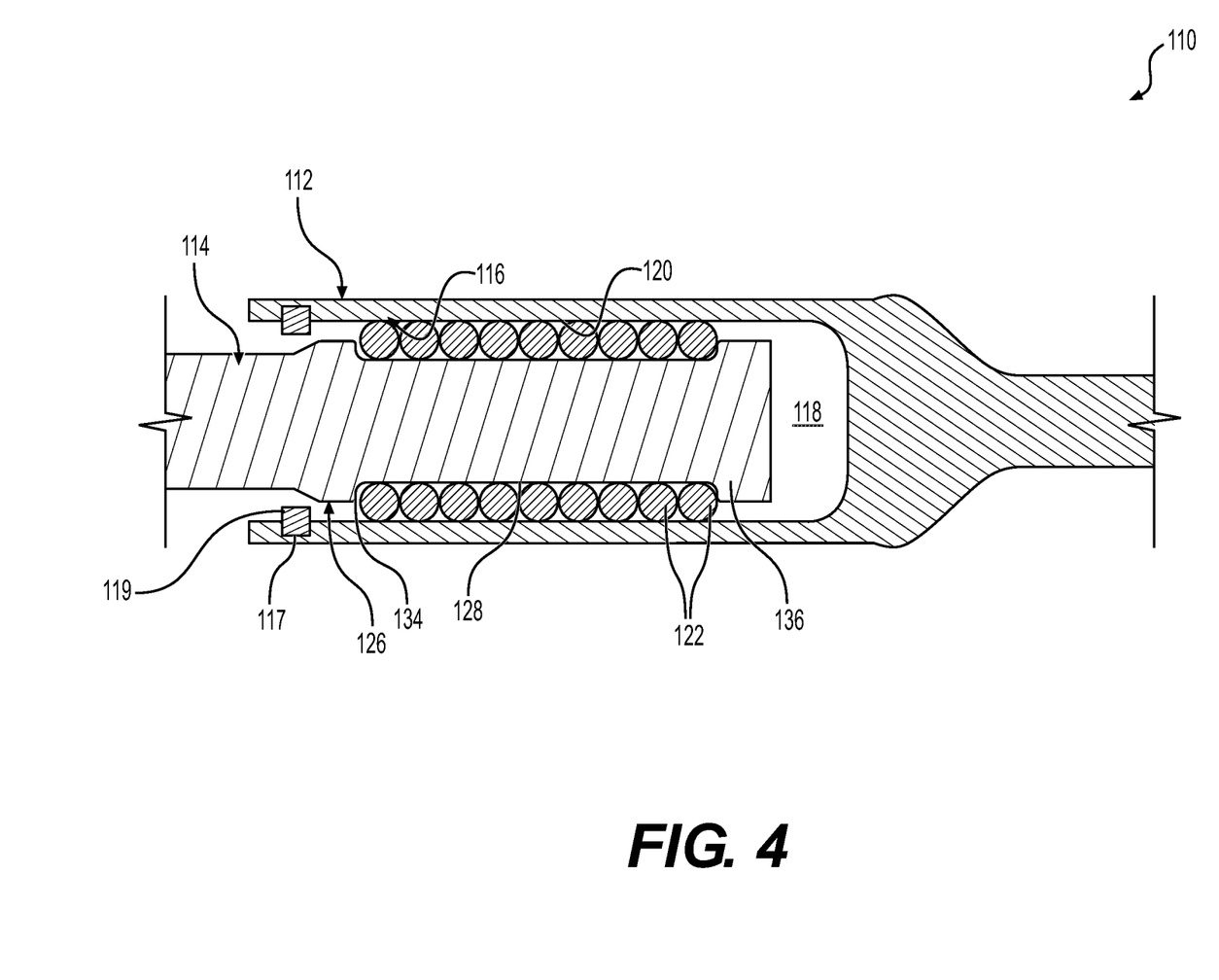
FIG. 4 is a perspective view of another embodiment of a shaft assembly according to the principles of the present disclosure.

Referring now to FIG. 4, a shaft assembly 110 is shown in the assembled condition in accordance with another embodiment. Unless otherwise stated, the shaft assembly 110 may share all the same features, elements, arrangements, compositions, and methods of assembly as that presented in FIGS. 1-3. However, the inner pockets 28 are now replaced with an inner groove 128. More particularly, the shaft assembly 110 includes an outer shaft member 112 and inner shaft member 114 telescopically engaged with the outer shaft member 112. The outer shaft member 112 includes an inner surface 116 defining a bore 118. The inner shaft member 114 is located within the bore 118 and moveable telescopically with respect to the outer shaft member 112. The inner surface 116 of the outer shaft member 112 defines a set of outer grooves 120 and a set of outer fluid grooves (not shown), which may be configured the same as those described in reference to FIGS. 1-3. The inner surface 116 may further include a ring groove 117 for accommodating a snap ring 119 for retaining the inner shaft member 114 within the bore 118.

The inner shaft member 114 defines an outer surface 126 that extends and is telescopically moveable generally along the longitudinal axis A when the shaft assembly 110 assembled. The outer surface 26 of the inner shaft member 14 defines inner grooves 128 and inner fluid grooves (not shown). The inner grooves 128 may be located in general locations previously described in relation to the line of pockets 29 described in reference to FIGS. 1-3. Moreover, each inner groove 128 may be configured to retain the same number of rolling elements 122 as the line of pockets 29 previously described. In the illustrated embodiment, each inner groove 128 holds eight rolling elements 122. Similar to the previous embodiment, the shaft assembly 110 does not utilize a cage for retaining the rolling elements 122. As illustrated, each inner groove 128 may extend between a first end 134 and a second end 136 and the rolling elements 122 may extend substantially between the first end 134 and the second end 136 and contact one another. The first end 134 and second end 136 may be partially sphere-shaped to abut a spherical surface of the rolling elements 122 and axially retain it therein. In some embodiments, the rolling elements 122 have a diameter and more than half of the diameter is located within the outer grooves 120 and the inner grooves 128. For example, because a cage is not needed, 95% or less, 85% or less, or 75% or less of the diameter of rolling elements 122 may be located within the outer grooves 120 and the inner grooves 128. In some embodiments, a diameter of the first end 134 and the second end 136 is slightly larger than the diameter of the rolling elements 122.

Figure 5:
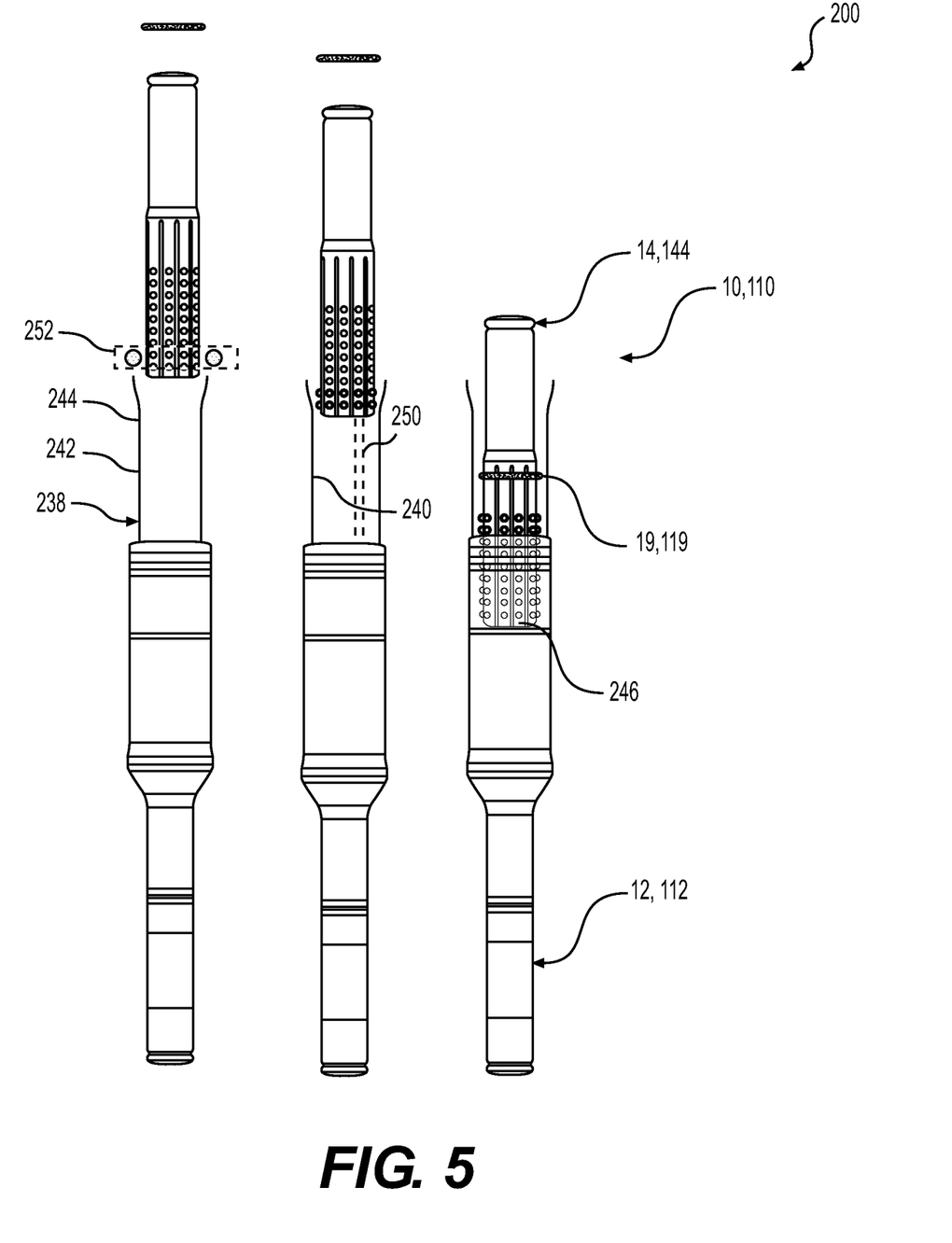
FIG. 5 is a plan view illustrating sequential steps in a method of assembling the shaft assembly according to the principles of the present disclosure.

FIG. 5 is a plan view illustrating sequential steps in a method 200 of assembling the shaft assembly according to the principles of the present disclosure. With initial reference to the leftmost drawing in FIG. 5, a sleeve 238 is located on an end of the outer shaft member 12, 112 that defines the bore 18, 118. The sleeve 238 includes an inner surface 240 and defines a straight section 242 located next to the outer shaft member 12, 112 and a tapered section 244 spaced from the outer shaft member 12, 112 by the straight section 242. The inner surface 240 of tapered section 244 extends gradually radially outwardly in a direction away from the straight section 242. A first portion next to a first end 246 of the inner shaft member 14, 114 is placed within the tapered section 244 and rolling elements 22, 122 are placed in a first circumferential array 248 in the inner pockets 28 or the inner groove 128. The inner shaft member 14, 114 is then is moved deeper into the sleeve 238 such that the first circumferential array 248 is retained against the inner surface 240 of the sleeve 238 and the first portion is located in the straight section 242. In some embodiments, the inner surface 240 of the straight section 242 may define rolling element retaining grooves 250 extending towards the outer shaft member 12, 112. Next, additional rolling elements 22, 122 are placed in a second circumferential array 252 in the inner pockets 28 or the inner groove 128 located on a second portion of the inner shaft member 14, 114. The process continues until each of the inner pockets 28 retain rolling elements 22, 122 or the inner groove 128 is filled with rolling elements 22, 122 as described above. The snap ring 19, 119 is then placed within the ring groove 17, 117.

Figure 6:
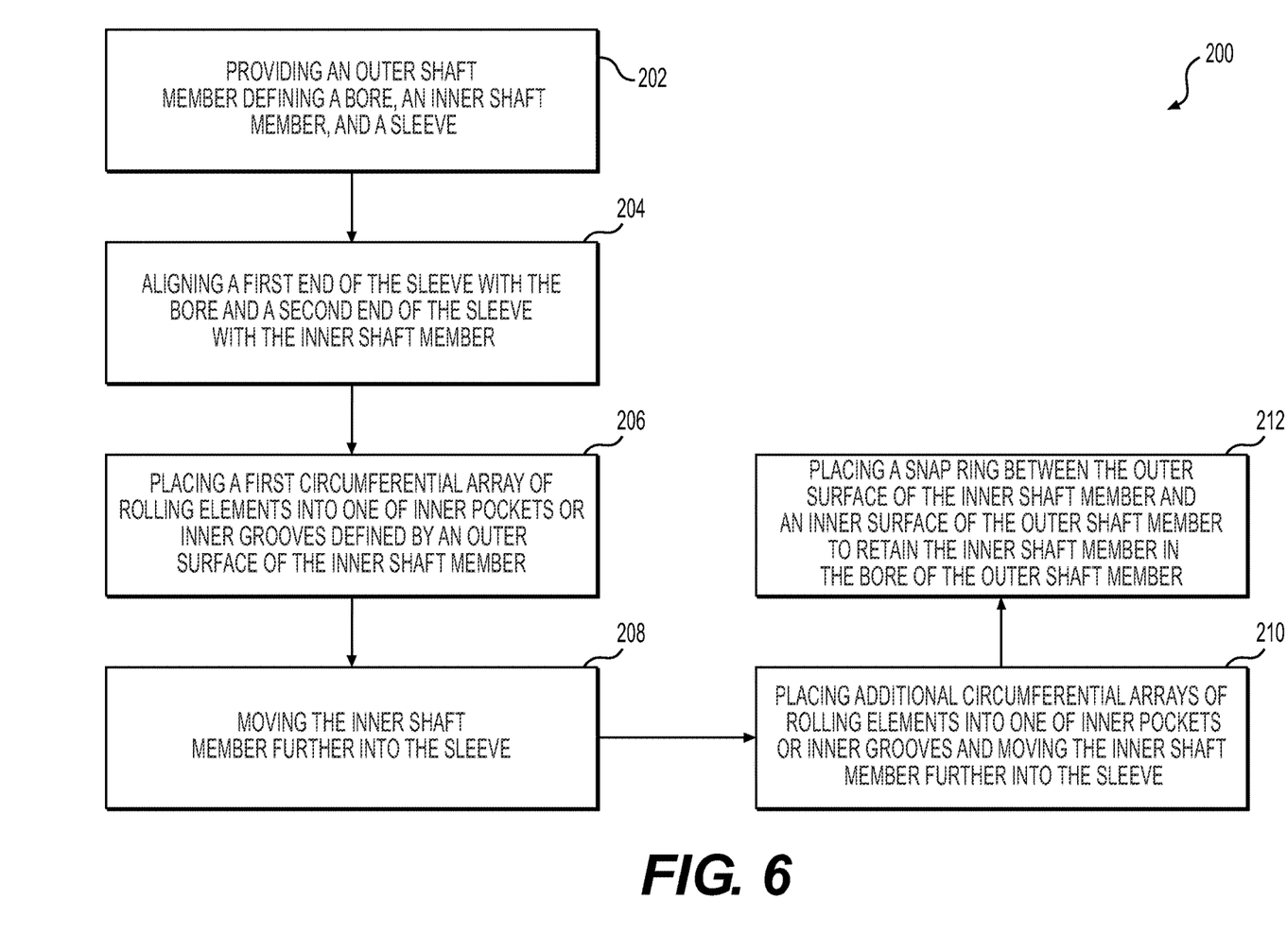
FIG. 6 is a flow diagram generally illustrating the method of assembling the shaft assembly according to the principles of the present disclosure.

FIG. 6 is a flow diagram generally illustrating the method 200 of assembling the shaft assembly according to the principles of the present disclosure. At 202, the method 200 includes providing an outer shaft member defining a bore, an inner shaft member, and a sleeve. At 204, the method continues by aligning a first end of the sleeve with the bore and a second end of the sleeve with the inner shaft member. In some embodiments, the second end of the sleeve defines a tapered section and the first end of the sleeve defines a straight section. At 206, the method continues by placing a first circumferential array of rolling elements into one of inner pockets or inner grooves defined by an outer surface of a first portion of the inner shaft member. At 208, the method includes moving the first portion of the inner shaft member further into the sleeve (e.g., into the straight section). In some embodiments, the inner shaft member is moved from the tapered section towards a straight section until the rolling elements are retained between one of inner pockets or inner grooves and an inner surface of the sleeve. At 210, the method continues by placing additional circumferential arrays (e.g., a second circumferential array) of rolling elements into one of inner pockets or inner grooves defined by another portion of the inner shaft member (e.g., a second portion) and moving the inner shaft member further into the sleeve. Step 210 repeats until all of the inner pockets contain a rolling element or each of the inner grooves are filled to rolling elements. Stated another way, at 210, the method repeats both steps 206 and 208 until all of the inner pockets contain a rolling element or each of the inner grooves are filled to rolling elements. At 212, the method continues by placing a snap ring between the outer surface of the inner shaft member and an inner surface of the outer shaft member to retain the inner shaft member in the bore of the outer shaft member.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, or component of any one embodiment can be used in conjunction with any of the other embodiments. Accordingly, the invention is not to be seen as limited by the foregoing description. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A shaft assembly for transmitting a torque, the shaft assembly comprising:
    an outer shaft member extending along an axis and including an interior surface defining a bore and a plurality of outer grooves at least partially delimiting the bore;
    an inner shaft member extending along the axis including an outer surface defining at least one of a plurality of inner pockets or a plurality of inner grooves aligned with the outer grooves;
    at least one rolling element located between the outer grooves and the inner pockets or the outer grooves and the inner grooves;
    wherein at least one of the outer surface of the inner shaft or the inner surface of the outer shaft is configured to axially retain the at least one rolling element and the shaft assembly does not include a cage; and
    wherein at least one of the inner surface of the outer shaft member defines a plurality of outer fluid grooves between the plurality of outer grooves or the outer surface of the inner shaft member defines a plurality of inner fluid grooves between the plurality of inner pockets or the plurality of inner grooves.

2. The shaft assembly of claim 1, wherein the outer surface of the inner shaft member defines the inner pockets and each of the inner pockets is sized to axially retain a single rolling element.

3. The shaft assembly of claim 2, wherein the inner pockets define a plurality of lines of pockets.

4. The shaft assembly of claim 3, wherein each of the lines of pockets and each of the outer grooves are parallel to the axis.

5. The shaft assembly of claim 4, wherein the outer grooves extend along the axis a first distance and the lines of pockets extend along the axis a second distance, wherein the first distance is greater than the second distance.

6. The shaft assembly of claim 3, wherein the lines of pockets and the outer grooves are disposed circumferentially around axis.

7. The shaft assembly of claim 1, wherein the at least one rolling element has a diameter and more than half of the diameter is located within the outer grooves and the inner pockets or the outer grooves and the inner grooves.

8. The shaft assembly of claim 1, wherein the inner surface of the outer shaft member defines said plurality of outer fluid grooves between the plurality of outer grooves and the outer surface of the inner shaft member defines said plurality of inner fluid grooves between the plurality of inner pockets or the plurality of inner grooves, each of the outer fluid grooves are aligned with one of the inner fluid grooves.

9. The shaft assembly of claim 1, wherein the inner surface of the outer shaft member defines a ring groove and a snap ring is located within the ring groove to retain the inner shaft member in the bore of the outer shaft member.

10. A shaft assembly for transmitting a torque, the shaft assembly comprising:
    an outer shaft member extending along an axis and including an interior surface defining a bore and a plurality of outer grooves at least partially delimiting the bore;
    an inner shaft member extending along the axis including an outer surface defining at least one of a plurality of inner pockets or a plurality of inner grooves aligned with the outer grooves;
    at least one rolling element located between the outer grooves and the inner pockets or the outer grooves and the inner grooves;
    wherein at least one of the outer surface of the inner shaft or the inner surface of the outer shaft is configured to axially retain the at least one rolling element and the shaft assembly does not include a cage; and
    wherein the outer surface of the inner shaft member defines the inner grooves and each inner groove extends between a first end and a second end, wherein the at least one rolling element includes a maximum amount of rolling elements disposed in abutting relation with one another in the inner groove.

11. The shaft assembly of claim 10, wherein the first end and the second end of the inner grooves define a partial spherical shape.

12. The shaft assembly of claim 11, wherein each of the inner grooves and each of the outer grooves are parallel to the axis.

13. A shaft assembly for transmitting a torque, the shaft assembly comprising:
    an outer shaft member extending along an axis and including an interior surface defining a bore and a plurality of outer grooves at least partially delimiting the bore;
    an inner shaft member extending along the axis including an outer surface defining at least one of a plurality of inner pockets or a plurality of inner grooves aligned with the outer grooves;
    at least one rolling element located between the outer grooves and the inner pockets or the outer grooves and the inner grooves;
    wherein at least one of the outer surface of the inner shaft or the inner surface of the outer shaft is configured to axially retain the at least one rolling element and the shaft assembly does not include a cage; and
    wherein the outer surface of the inner shaft member defines the inner grooves and each inner groove extends between a first end and a second end, wherein the at least one rolling element includes a plurality of rolling elements filling the inner groove to capacity, wherein the outer grooves extend along the axis a first distance and the inner grooves extend along the axis a second distance, wherein the first distance is greater than the second distance.

14. A method of assembling a shaft assembly for transmitting a torque, the method comprising:
providing an outer shaft member defining a bore, an inner shaft member, and a sleeve;
aligning a first end of the sleeve with the bore and a second end of the sleeve with the inner shaft member, the first end of the sleeve including a cylindrical straight section and the second end of the sleeve including a frustoconical tapered section diverging radially outwardly away from the cylindrical straight section;
locating a first portion of the inner shaft member in the frustoconical tapered section and placing a first circumferential array of rolling elements into one of inner pockets or inner grooves defined by an outer surface of the first portion of inner shaft member; and
placing the first portion and the first circumferential array of rolling elements past the frustoconical tapered section and into engagement with an inner surface of the cylindrical straight section of the sleeve.

15. The method of claim 14, further including locating a second portion of the inner shaft member in the frustoconical tapered section and placing a second circumferential array of rolling elements into one of inner pockets or inner grooves located on the second portion and placing the first portion into the cylindrical straight section.

16. The method of claim 15, further including placing a snap ring between the outer surface of the inner shaft member and an inner surface of the outer shaft member to retain the inner shaft member in the bore of the outer shaft member.

17. The method of claim 14, wherein the first circumferential array of rolling elements is placed into inner pockets.

18. The method of claim 14, wherein the first circumferential array of rolling elements is placed into inner grooves.

19. The method of claim 14, further including placing the first circumferential array of rolling elements into rolling element retaining grooves defined by the inner surface of the cylindrical straight section of the sleeve.

* * * * *